J. E. FLITCROFT.
WATER AGITATOR FOR ICE FREEZING APPARATUS.
APPLICATION FILED MAY 4, 1915.
1,213,179.
Patented Jan. 23, 1917.
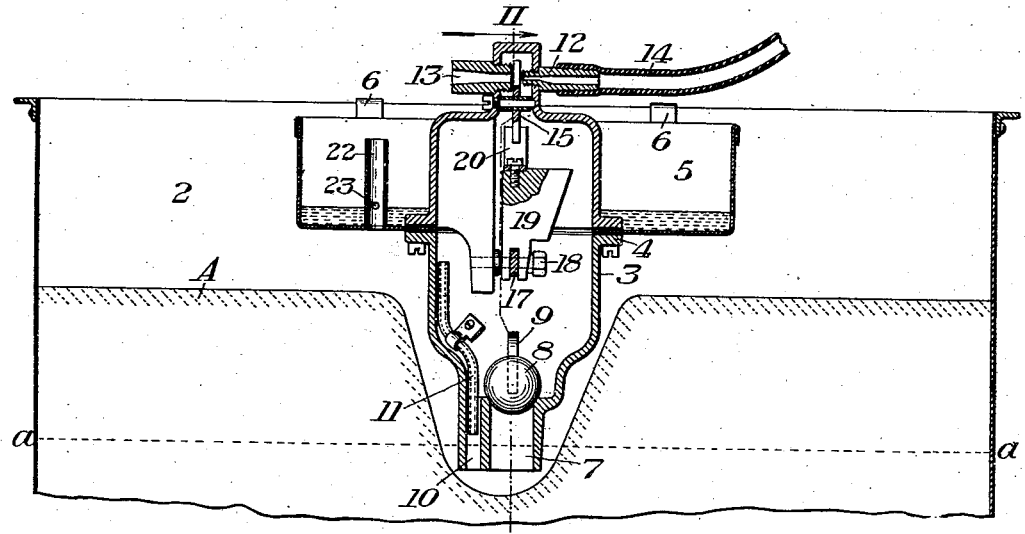
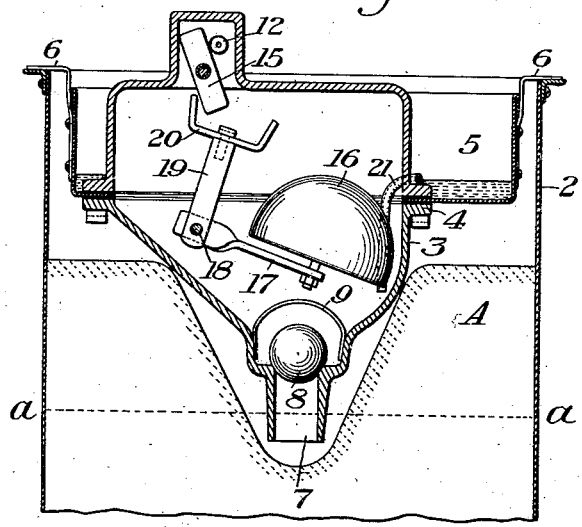

J. E. FLITCROFT.
WATER AGITATOR FOR ICE FREEZING APPARATUS.
APPLICATION FILED MAY 4, 1915.

1,213,179.

Patented Jan. 23, 1917.

UNITED STATES PATENT OFFICE.

JAMES E. FLITCROFT, OF PITTSBURGH, PENNSYLVANIA, ASSIGNOR TO P. WALL MANUFACTURING SUPPLY COMPANY, OF PITTSBURGH, PENNSYLVANIA, A CORPORATION OF PENNSYLVANIA.

WATER-AGITATOR FOR ICE-FREEZING APPARATUS.

1,213,179.      Specification of Letters Patent.      Patented Jan. 23, 1917.

Application filed May 4, 1915. Serial No. 25,692.

*To all whom it may concern:*

Be it known that I, JAMES E. FLITCROFT, a citizen of the United States, residing at Pittsburgh, Allegheny county, Pennsylvania, have invented a new and useful Water-Agitator for Ice-Freezing Apparatus, of which the following is a full, clear, and exact description, reference being had to the accompanying drawings, forming part of this specification, in which—

Figure 3:
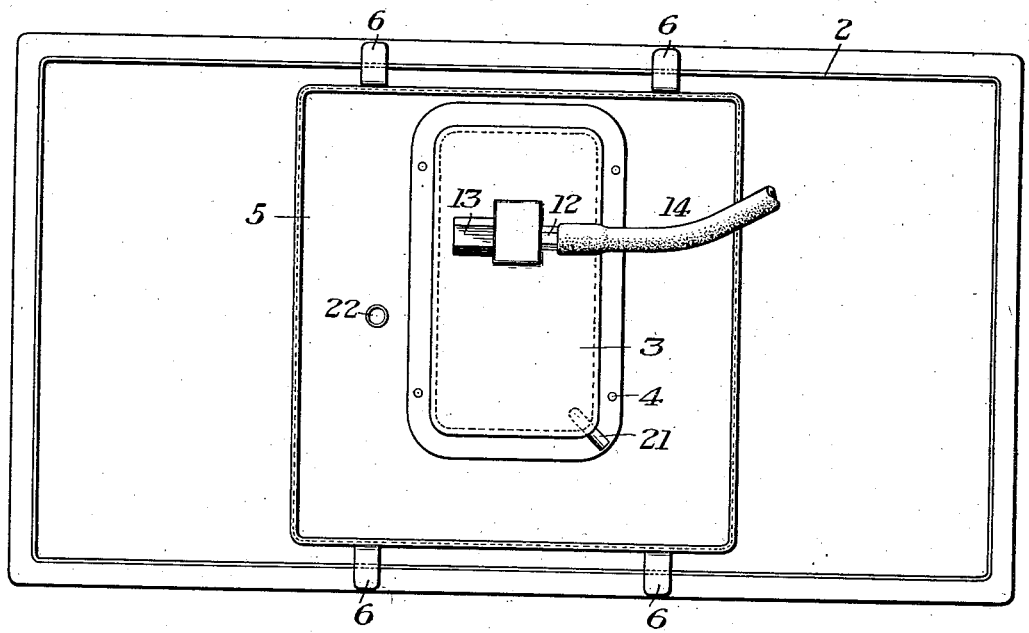
Figure 4:
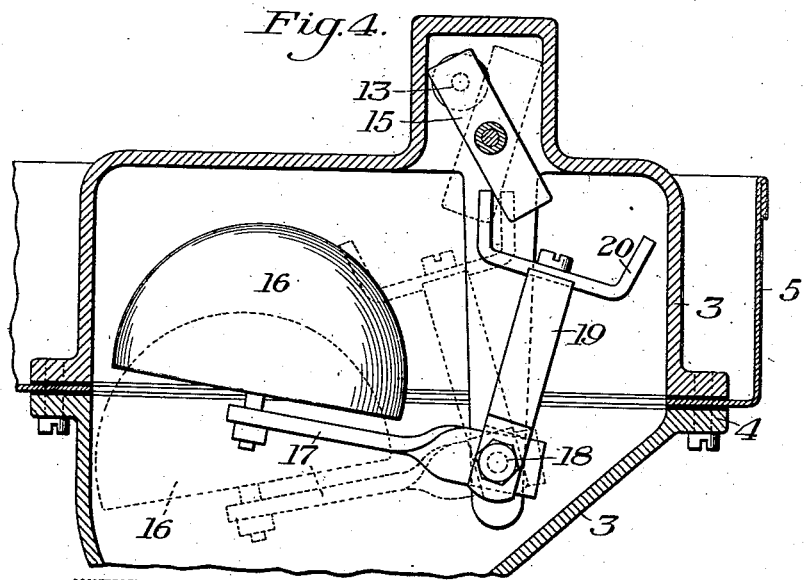

Figures 1 and 2 are sectional views taken in planes at substantially right angles to each other, and showing one form of apparatus embodying my invention. Fig. 3 is a top plan view of the device, and Fig. 4 is a sectional view on a larger scale, and showing, more particularly, the valve actuating device.

My invention has relation to a water agitating device for use in the manufacture of ice from natural or raw water, as distinguished from distilled water, and is designed to provide a simple and efficient device of this character.

The nature of my invention will be best understood by reference to the accompanying drawings, in which I have shown the preferred embodiment of my invention, and which will now be described, it being premised, however, that various changes can be made in the details of construction and arrangement of the several parts without departing from the spirit and scope of my invention as defined in the appended claims.

In these drawings, the numeral 2 designates an ice freezing can of any usual or suitable character, and in which is to be frozen a block or cake of ice, such as indicated at A.

3 designates a receptacle formed in sections and secured together at 4 in a manner to provide a substantially air-tight joint. This receptacle has attached thereto a water pan 5, and the receptacle and pan are adapted to be removably supported centrally on the freezing can 2 in any suitable manner, as by the clips 6. The bottom of the receptacle 3 has an inlet 7 normally closed by a check valve 8. This valve is shown as consisting of a ball mounted within a suitable guard or cage 9. To one side of the inlet 7 is a smaller outlet opening 10. Extending downwardly within this opening and upwardly within the chamber of the receptacle 3 is an air pipe 11. Connected to the upper portion of the receptacle are the nozzles 12 and 13, the nozzle 12 being designed to have a connection such as indicated by the hose 14 with a source of air under pressure. The nozzle 13 is open at both ends, and discharges to the atmosphere at its outer end. Mounted between the adjacent inner ends of the two nozzles is a butterfly valve 15 which is adapted to swing into and out of position to interrupt the passage from one nozzle to the other.

16 designates a float within the receptacle 3. This float is mounted on a lever arm 17 fulcrumed at 18 and having an upwardly extending member 19 carrying a fork 20 which, as it oscillates, is adapted to engage and trip or throw the valve 15 from one of its positions to the other. The member 19 is preferably weighted so that it will quickly complete its movement past center.

21 designates a small pipe within the receptacle 3 with its outer end extending through a wall thereof into the water pan 5. The latter is also provided with the overflow pipe 22 extending to a considerable height within the pan and having a small inlet opening 23 at a lower level.

In use, the device is placed on the freezing can in substantially the position indicated in the drawings, with the inlet opening 7 and discharge opening 10 extending somewhat below the normal water level *a, a*, in the can. Air under pressure is admitted to the hose 14. At this time the receptacle 3 being empty, the float 16 is in the position shown in Fig. 2, and the valve 15 is thrown to a position to give free communication between the two nozzles 12 and 13. The jet of air discharged by the nozzle 12 enters and passes out through the nozzle 13, thereby creating a strong suction or siphoning action within said chamber, sufficient to open the valve 8 and cause water to enter the receptacle 3 through the inlet 7. When the water rises in the receptacle to a sufficient extent to move the float to a position such as indicated in Fig. 4, the valve 15 is thrown to a position to cut off communication between the two nozzles. The air discharged by the nozzle 12 is then deflected downwardly into the receptacle, where it rapidly builds up a pressure sufficient to eject the water through discharge opening 10 into the can. The pipe or tube 11 projects upwardly to a position where it will be uncovered during this ejecting action and some air will be discharged into the water in the can due to the jet action of the water being discharged through the opening 10. When the water in the receptacle again falls to a position where the float restores the valve 15 to its initial position, the action is reversed and water is again sucked up into the receptacle 3. This alternate action of sucking water from the can into the receptacle and ejecting it back into the can from the receptacle occurs rapidly, thereby creating the desired agitation of the water in the can. Sufficient suction will be created within the receptacle to cause it to rapidly fill or partially fill with water, notwithstanding the fact that the outer end of the pipe 21 may be at times uncovered by the water in the pan 5.

When water is being ejected from the receptacle, the air pressure built up within the latter will force some of the water upwardly through this pipe and into the pan 5; and during the periods of suction or siphoning some water will be drawn back from the pan through this pipe into the receptacle. The result of this is that at the end of the freezing operation a large part of the sediment which was present in the water in the can will be found to have collected in the pan 5. It is, of course, well known that the water containing the most sediment or impurities will be the last to freeze, and will, therefore, be gradually worked toward the upper central portion of the can into that part of the cake of ice which is the last to freeze. Therefore it is this sediment containing water which, as the operation proceeds, is largely drawn upwardly into the receptacle 3 and pan 5. By retaining the last charge of water drawn up within the receptacle, substantially all the impurities can be removed.

The overflow pipe 22 forms a means whereby sufficient water may be fed back into the can at the close of the freezing operation to largely fill up the upper central cavity in the cake A so that the final form of the cake, before the agitating device is removed, will be as shown in Figs. 1 and 2. If desired, sufficient clear water can be subsequently fed in to completely fill up this central cavity.

The advantages of my invention will be apparent to those familiar with this art, since it provides a very simple form of device which can be readily attached to and removed from the ordinary freezing cans and connected up to a source of air pressure. Pressure pipes of this kind are ordinarily employed in ice freezing plants, so that the use of the invention adds but little to the installation cost.

The rapidly alternating, pulsating action of the device maintains such a degree of agitation within the water in the can that the impure water and sediment is prevented from freezing and is gradually collected at the upper central portion of the cake. The device enables cakes or blocks of ice to be frozen which will be clear and transparent throughout and which are free from "cores".

It will be obvious that various changes can be made in the form of the device without departing from the spirit and scope of my invention as defined in the claims. For instance, the receptacle 3 may be of any suitable construction; various forms of floats and valve throwing connections operated thereby may be employed, and other changes may be made.

I claim:

1. A water agitating device, comprising a receptacle having a water inlet and a water outlet, an air inlet and an air outlet in alinement with each other, means for continuously supplying air under pressure to said inlet, and means for intermittently opening and closing the air outlet for alternately creating suction and pressure within said receptacle, substantially as described.

2. A water agitating device, comprising a receptacle adapted for support on an ice freezing can and having a water inlet and outlet arranged to communicate with the interior of the can below the water level thereof, an air inlet and an air outlet in alinement with each other, means for continuously supplying air under pressure to said inlet, and means for intermittently opening and closing the air outlet for creating alternately suction and pressure within said receptacle, substantially as described.

3. A water agitating device, comprising a closed chamber having a water inlet opening and a water outlet opening, means for creating alternately suction and pressure within said chamber, and a water receptacle having a connection with the interior of said chamber, substantially as described.

4. A water agitating device, comprising a closed chamber having a water inlet opening and a water outlet opening, means for creating alternately suction and pressure within said chamber, a water receptacle having a connection with the interior of said chamber, and also having an overflow outlet, substantially as described.

5. A water agitating device, comprising a closed chamber having a valved water inlet and a water outlet, an air pipe or tube extending within the outlet and upwardly within the chamber, and means for alternately creating a suction and pressure within said chamber, substantially as described.

6. A water agitating device, comprising a closed chamber having an opening for the admission and discharge for the water, there being an air inlet to said chamber and an air outlet in alinement therewith, a valve for alternately opening and closing communication between said air inlet and outlet, and means for shifting the position of said valve, substantially as described.

7. A water agitator, comprising a closed chamber having a water inlet and a water outlet, and also having an air passage extending across its upper portion, a valve arranged to control said passage, and means actuated by the water level in said chamber for shifting said valve, substantially as described.

In testimony whereof, I have hereunto set my hand.

JAMES E. FLITCROFT.

Witnesses:
  GEO. W. HUNT,
  MILAN ROSS, Jr.